United States Patent
Gee et al.

[15] 3,650,512
[45] Mar. 21, 1972

[54] QUENCHING METHOD AND APPARATUS FOR EXHAUST GASES

[72] Inventors: Lawrence N. Gee, Hobart; Kenneth M. Marrs; Edwin S. Rutkin, both of Gary, all of Ind.

[73] Assignee: United States Steel Corporation

[22] Filed: Dec. 4, 1969

[21] Appl. No.: 881,970

[52] U.S. Cl. ..........................261/7, 261/116, 261/DIG. 9, 55/228
[51] Int. Cl. ............................................B01f 3/04
[58] Field of Search ...............261/116, 118, DIG. 9, 7, 8; 55/228

[56] References Cited

UNITED STATES PATENTS

| | | | |
|---|---|---|---|
| 1,791,814 | 2/1931 | Hillery | 261/116 |
| 2,090,994 | 8/1937 | Brandes | 261/116 X |
| 2,747,847 | 5/1956 | Otto | 261/116 X |
| 2,831,467 | 4/1958 | Guczky | 261/DIG. 9 |
| 3,067,991 | 12/1962 | Davy et al. | 261/DIG. 9 |

Primary Examiner—Tim R. Miles
Attorney—Ralph H. Dougherty

[57] ABSTRACT

Exhaust gases from an oxygen steelmaking furnace are quenched with water which is recirculated and contains a large quantity of solids. In conventional quenching systems such solids can clog the water pipes. The invention is an arrangement of the pipes which assures gravity drainage during interruptions and prevents solids from accumulating in the pipes and clogging them.

7 Claims, 3 Drawing Figures

Patented March 21, 1972

INVENTORS.
LAWRENCE N. GEE,
KENNETH M. MARRS &
EDWIN S. RUTKIN

By Walter P. Wood

Attorney

Patented March 21, 1972

INVENTORS.
LAWRENCE N. GEE,
KENNETH M. MARRS &
EDWIN S. RUTKIN
By Walter P. Wood
Attorney

QUENCHING METHOD AND APPARATUS FOR EXHAUST GASES

This invention relates to an improved method and apparatus for circulating water to the quencher of an oxygen steelmaking furnace.

In an oxygen steelmaking process, a stream of oxygen contacts molten iron in a vessel and oxidizes impurities from the iron. Exhaust gases from the furnace are extremely hot and dirty and must be cooled and cleaned before they discharge into the atmosphere. Conventionally the furnace is equipped with a hood positioned over its mouth and a quencher leading from the hood. Water sprays are directed into the gases as they pass through the quencher to cool the gases and collect entrained solids and other contaminants. The water and collected solids discharge from the quencher into suitable handling equipment, which may include a floor elbow and a collector main. Common practice is to recirculate the quench water, which of course carries a large quantity of solids, through a system of pipes. As long as the spray continue to operate, the pipes do not tend to clog. The flow is sufficient to keep the solids moving and prevent their settling and compacting in the pipes.

In previous water circulation systems with which we are familiar, whenever operation of the sprays is interrupted and flow through the pipes stops, the solids settle on the low side of the pipes and in the low spots in the system. There is no opportunity for such solids to drain by gravity, and the solids may compact in the pipes and clog them, eventually preventing flow altogether. Spray water performs the additional function of cooling the nozzle through which it flows. If no water passes through the nozzle, it burns off and cannot be replaced unless the furnace is shut down long enough for the quencher to cool to a sufficiently low temperature that a maintenance man can enter. Practice has been to operate with fewer than the full number of sprays when any pipe is clogged. The result is that the quench water does not reach all parts of the quencher and does not effectively quench the exhaust gas. Thus the gas temperature remains unduly high and consequently decreases the efficiency of the gas cleaner farther along in the system.

An object of our invention is to provide an improved method and apparatus for circulating water to a quencher and assuring that the water pipes do not become clogged.

A further object is to provide a method and apparatus which offer the foregoing advantage, yet can be applied to existing installations with only simple structural changes.

Figure 1:
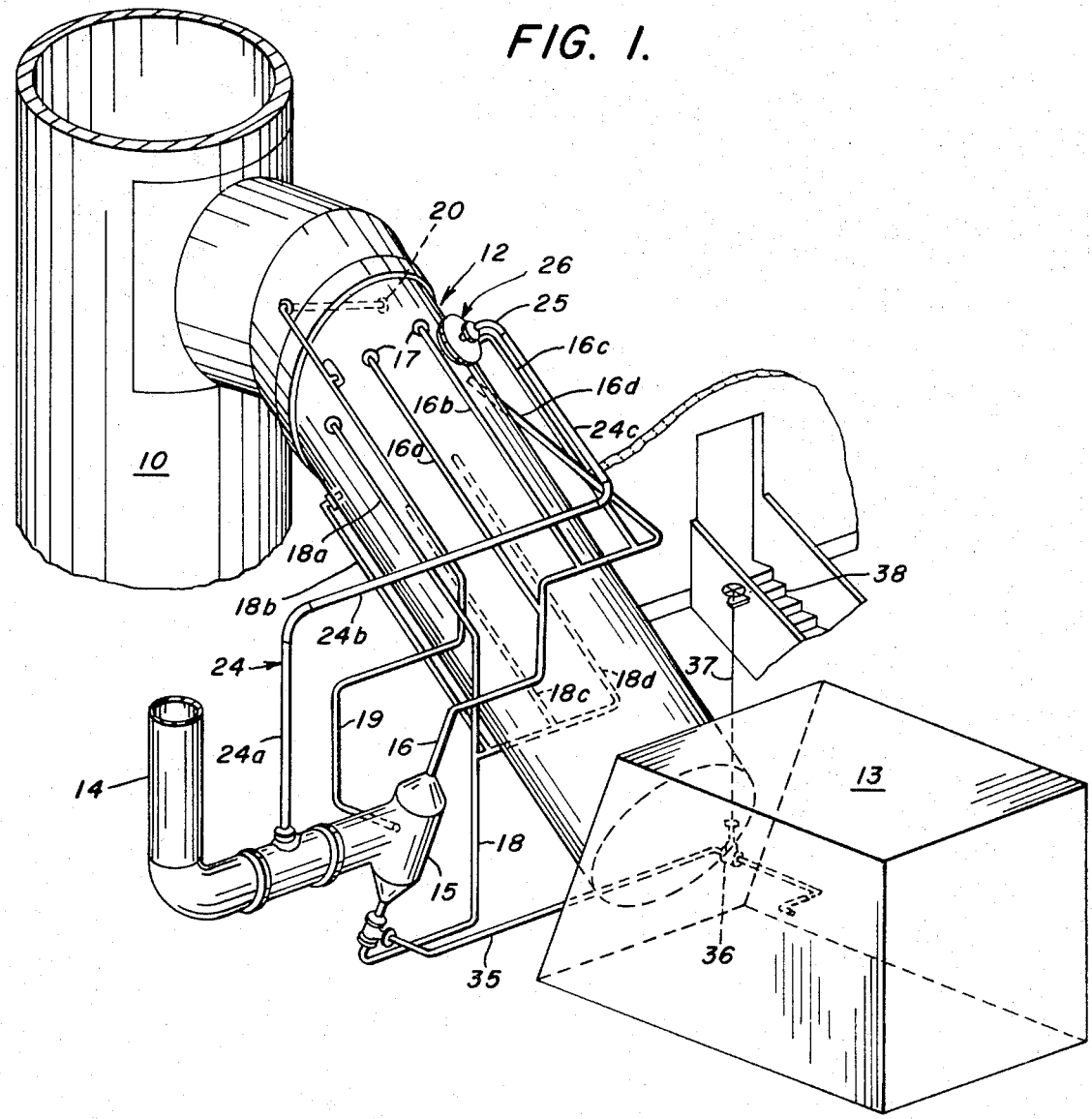
FIG. 1 is a partly diagrammatic isometric view of the hood and quencher of an oxygen steelmaking furnace equipped with our improved water-circulation system.
Figure 2:
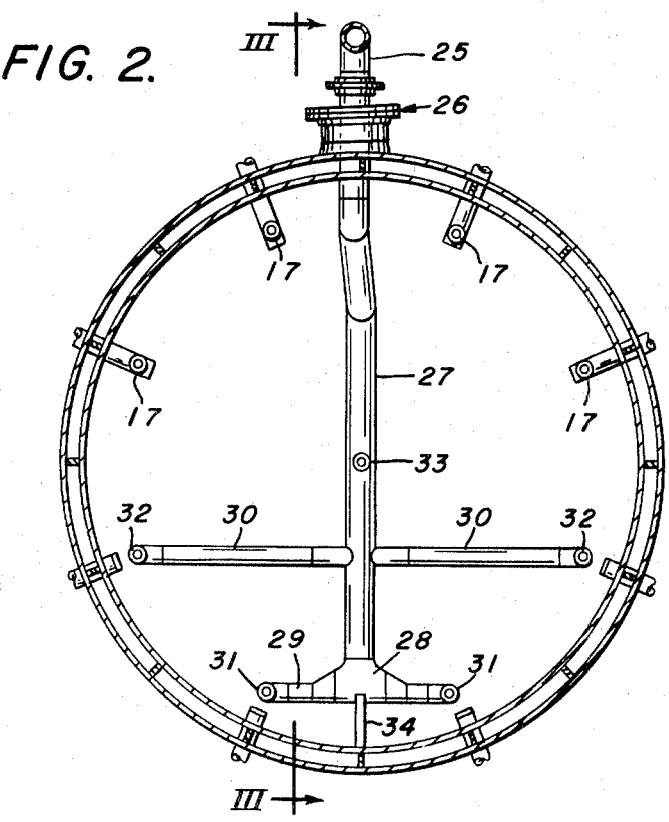
FIG. 2 is a cross-sectional view through the quencher.
Figure 3:
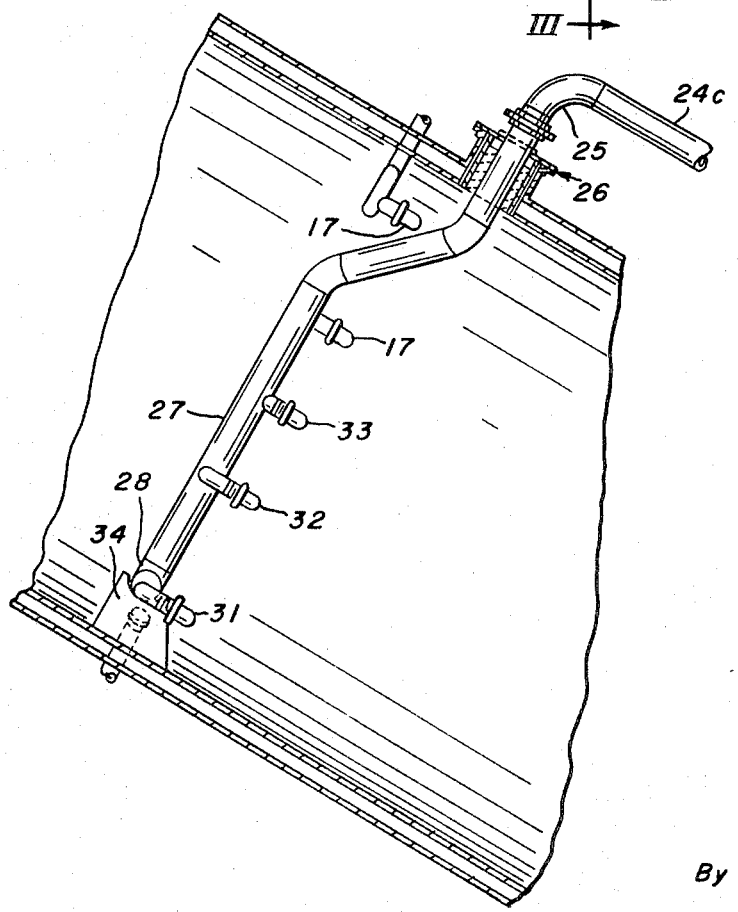
FIG. 3 is a longitudinal section substantially on line III-III of FIG. 2.

FIG. 1 shows the hood 10 and quencher 12 of a conventional oxygen steelmaking furnace. Exhaust gases from the furnace enter the bottom of the hood at a temperature of perhaps 3,000 F. From the hood the gases go into the quencher, which is a hollow water-jacketed cylinder sloping downwardly from the upper end of the hood. Within the quencher the gases are subjected to water sprays which collect entrained solids and other contaminants and lower the gas temperature to perhaps 180–200 F. The gases and water discharge from the lower end of the quencher into a flood elbow 13 and thence into a collector main (not shown).

The conventional water-circulation system for the quencher includes a supply main 14 which terminates in a tee 15 located alongside the quencher 12. The central axis of the arm of the tee lies approximately in a plane which is perpendicular to the central axis of the quencher. A pipe 16 extends from the upper end of the tee arm and has four branches 16a, 16b, 16c and 16d which lead to four spray nozzles 17 spaced around the upper portion of the quencher 12. Another pipe 18 extends from the lower end of the tee arm and has four branches 18a, 18b, 18c and 18d, which extend to locations spaced around the lower portion of the quencher. In a conventional system the last-named branches lead to spray nozzles similar to nozzles 17, but we have eliminated these nozzles and plugged the branches of pipe 18 where they enter the quencher. We use pipe 18 and its branches only for standby purposes. The locations at which the eight branches of pipes 16 and 18 enter the quencher are uniformly spaced around a common circle. A third pipe 19 extends from one side of the tee to a nozzle 20 upstream of nozzles 17 and centered in the quencher.

Water from the sprays and solids collected thereby accumulate at the bottom of the quencher. Solids are carried in suspension by the circulating water. In the conventional system whenever operation of the sprays is interrupted, the suspended solids settle in the branches and low sports of pipe 18 and clog them. To avoid this difficulty we have removed the nozzles from these branches and plugged them, as already pointed out, and provided a new arrangement which assures that all pipes drain completely by gravity from the highest point in both directions, either through the nozzles or back to the main. There is no similar problem with the branches of pipe 16 or with pipe 19, since they are so situated that when operation of the sprays is interrupted, the circulating water, with it's collected solids, will drain therefrom either into quencher 12 through nozzles 17 and 20 or into tee 15 through pipes 16 and 19.

In accordance with our invention, we connect a fourth pipe 24 to the supply main 14. Pipe 24 has a segment 24a extending vertically upwardly from the main, a segment 24b sloping upwardly from the top of segment 24a, and a segment 24c extending perpendicularly from the upper end of segment 24b to an elbow 25 connected to a manhole assembly 26 in the upper wall of quencher 12. A pipe segment 27 extends downwardly from elbow 25 along a diameter of the quencher a few inches upstream of the nozzles 17. The lower end of segment 27 carries a tee 28, the arms of which carry horizontal branches 29. Segment 27 carries two more horizontal branches 30 extending in opposite directions therefrom intermediate the tee 28 and the central axis of the quencher. The ends of branches 29 and 30 carry nozzles 31 and 32 respectively. The eight nozzles 17, 31 and 32 are uniformly spaced around a common circle. A nozzle 33, which is connected to segment 27, lies on the center of this circle, which is coincident with the central axis of the quencher. All the nozzles are directed downstream of the quencher. The inside wall of the quencher carries a support plate 34 on which the tee 28 rests. The tee is not attached to the support plate, but is free to move therealong as the parts undergo thermal expansion.

We connect a drain pipe 35 to the lower portion of tee 15 above the pipe 18. The drain pipe slopes downwardly away from the tee and contains a valve 36. We equip the valve with a long stem 37 which we can operate from a convenient location such as the stairway 38. Any solids which settle in tee 15 discharge into the drain pipe 35, from which we remove them to flood elbow 13 periodically by opening valve 36.

From the foregoing description it is seen that our invention affords a single effective method and system for circulating quench water. Our system avoids any pipes which contain low spots that would operate as traps to retain collected solids whenever the system is shut down and would cause them to clog. The elbow 25 is the high point of the water supply piping to the lower set of nozzles from which point circulating water drains in both directions when operation of the system is interrupted.

We claim:

1. In an oxygen steelmaking installation which includes a quencher through which pass hot exhaust gases containing entrained solids, said quencher being equipped with a plurality of nozzles lying on a common circle spaced around its circumference throughout both the upper and lower portions thereof and directed downstream with respect to the gas flow, said nozzles being arranged to spray water into the gases to cool them and collect solids therefrom, the combination therewith of an improved system for circulating water to said nozzles, said system comprising a supply main, a first pipe connected to said main and leading to the nozzles in the upper portion of said quencher and a second pipe connected to said main and leading to the nozzles in the lower portion of said quencher, both said pipes having respective high points between said main and said nozzles and extending only downwardly and horizontally between said high points and said main and between said high points and said nozzles, whereby the pipes drain completely in both directions from said high points whenever operation of the system is interrupted.

2. A combination as defined in claim 1 in which said second pipe includes a segment entering said quencher at the upper surface thereof and extending diametrically downward, and the nozzles at the lower portion of said quencher are connected to said segment.

3. A combination as defined in claim 2 in which the connection between said segment and said nozzles includes branches extending horizontally from said segment and a tee section at the bottom of said segment from which branches extend horizontally, all of said branches being provided with spray nozzles.

4. A combination as defined in claim 3 in which said segment is provided with a nozzle, the axis of which is coincident with the axis of said quencher.

5. A combination as defined in claim 2 in which the lower internal surface of said quencher is provided with a support plate against which said tee section rests and is free to move therealong at the parts undergo thermal expansion.

6. A combination as defined in claim 1 in which said high point of said second pipe is formed by the intersection of a pipe segment exterior to said quencher and parallel to the axis thereof with a second segment that enters said quencher and extends diametrically downward therethrough perpendicular to the axis thereof.

7. A combination as defined in claim 1 in which said supply main is provided with a drain system including a downwardly sloping pipe connected to the bottom of said main, a valve in said last-named pipe, and control means for said valve operable at a distance therefrom.

* * * * *

UNITED STATES PATENT OFFICE
CERTIFICATE OF CORRECTION

Patent No. 3,650,512      Dated March 21, 1972

Inventor(s) Lawrence N. Gee, et al

It is certified that error appears in the above-identified patent and that said Letters Patent are hereby corrected as shown below:

Column 1, line 17, "floor" should read -- flood --.
Column 4, line 8, "at" should read -- as --.

Signed and sealed this 31st day of October 1972.

(SEAL)
Attest:

EDWARD M. FLETCHER, JR.
Assisting Officer

ROBERT GOTTSCHALK
Commissioner of Patents